Figure 1:
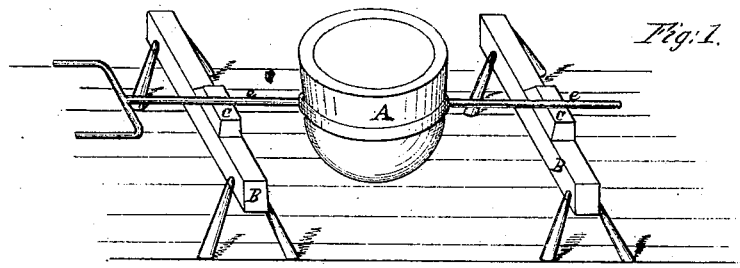

2 Sheets. Sheet 1

J. J. Johnston,
Manf. Steel.

No. 97,017.   Patented Nov. 16, 1869

Witnesses
Geo. H. Thomas
John Lockie

Inventor
James J. Johnston

J. J. Johnston,
Manf. Steel.

No. 97017

Patented Nov. 16, 1869.

2 Sheets, Sheet 2.

UNITED STATES PATENT OFFICE.

JAMES J. JOHNSTON, OF ALLEGHENY, PENNSYLVANIA, ASSIGNOR TO HIMSELF, ALEXANDER POSTLEY, SAMUEL H. NESBIT, I. C. PERSHING, LEWIS PETERSON, AND THOMAS FAWCETT, OF SAME PLACE, AND JOHN HUNTER, OF ALLIANCE, OHIO.

IMPROVED PROCESS OF MANUFACTURING STEEL.

Specification forming part of Letters Patent No. 97,017, dated November 16, 1869.

*To all whom it may concern:*

Be it known that I, JAMES J. JOHNSTON, of the city and county of Allegheny, and State of Pennsylvania, have invented a certain new and useful Process for Manufacturing Steel; and I do hereby declare that the following is a full, clear, and exact description thereof, reference being had to the accompanying drawings, and to the letters and figures of reference marked thereon.

The present state of the art of manufacturing steel may be stated, briefly, as consisting substantially as follows: first, in taking a good article of "forge-iron" or ",puddled iron" and converting it by what is known as "cementation" into "blister-steel," which is then broken or cut into small pieces and placed in crucibles and melted with a high degree of heat, then cast into ingots, after which they are reheated and subjected to the action of the hammer; second, in granulating molten cast-iron by causing it to fall in fine streams from a height into a reservoir of water or other place, and then placing this granulated iron with suitable detersive, converting, and fluxing agents into crucibles and subjecting the whole to an intense heat until the granulated iron is melted, which is then cast into ingots of the desired form, which are afterward reheated and then hammered; third, in mixing with the molten iron in the "puddling-furnace" detersive and converting fluxes, composed in the main of manganese, nitrate of soda, and carbonaceous matter variously compounded, and mixed into and among the molten iron, which is then puddled and formed into balls, which are squeezed or hammered and then reheated and rolled into the desired form; fourth, in converting malleable cast-iron into steel by cementation and chemical agencies; fifth, in the manufacture of steel by what are known as "Heaton's process" and the "Bessemer process," the operations of which are well understood by all skilled in metallurgy.

The foregoing and the use of a large number of chemical ingredients variously applied in and out of the furnace and crucible may be said to be about the present knowledge and state of the art of manufacturing steel.

The great desideratum with manufacturers of steel is to obtain a process whereby steel of any desired quality may be made with ease, facility, and cheaply from all kinds of pig metal, whether it be red-short or cold-short, cold-blast or hot-blast, coke-iron or charcoal-iron, white, gray, silver-gray, dark, or mottled in color and appearance, or close or open-grained in texture.

Now, the object of my invention is to provide a process whereby steel of any desired quality may be manufactured from all kinds of pig metal, however and wherever made, and accomplish the same with ease, facility, and cheapness, with ordinary intelligent labor and without the use of crucibles.

The nature of my invention consists in bringing cast-iron to its most fluid condition by means of a suitable furnace, and then treating and manipulating it in a vessel and a copper mold suspended or supported upon glass or other non-conductor of electricity, and afterward subjecting the congealed mass of metal to a process of cementation, remelting and casting ingots of the same in copper molds for the purpose of manufacturing steel or semi-steel.

To enable others skilled in the art of manufacturing steel to use my invention, I will proceed to describe more fully my process.

Figure 2:
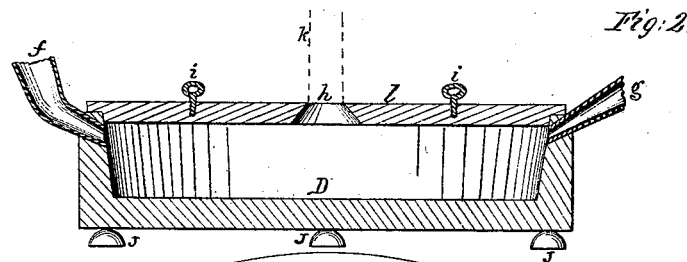
Figure 3:
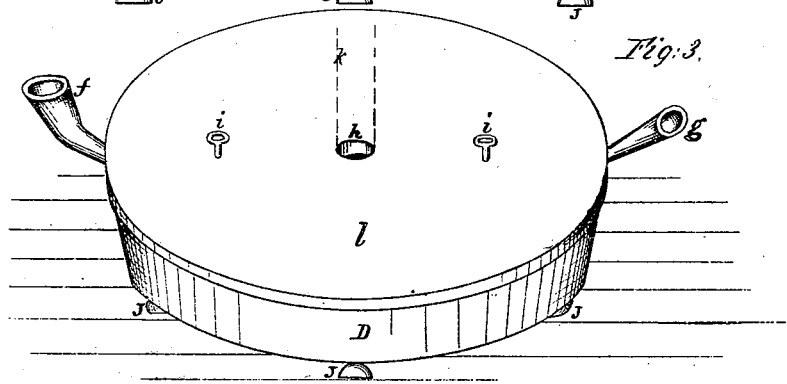
Figure 4:
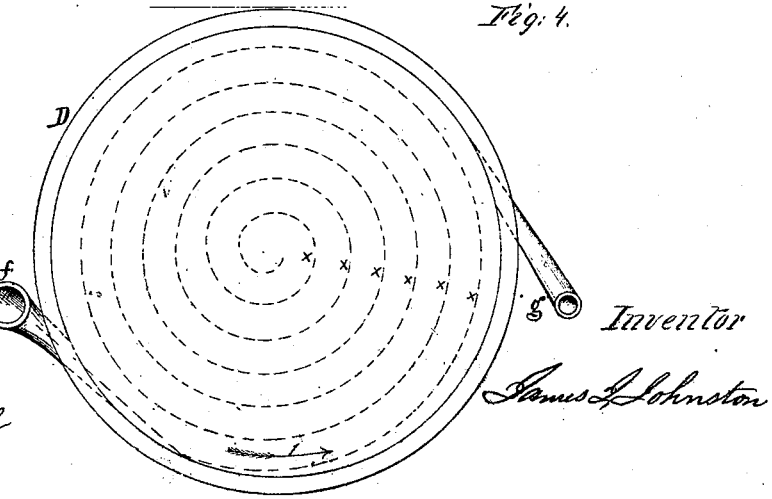
Figure 5:
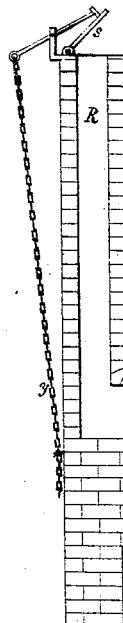
Figure 5:
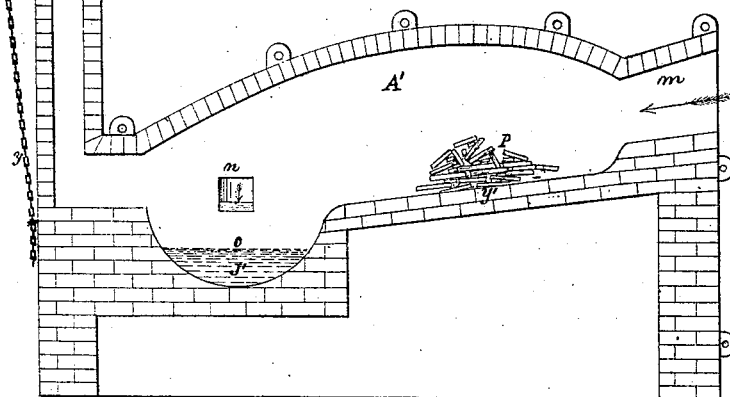
Figure 6:
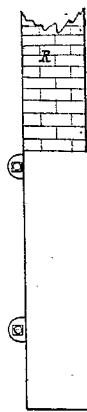
Figure 6:
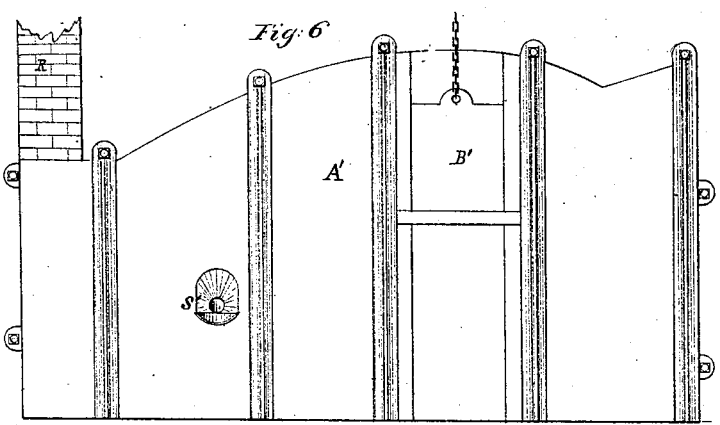
Figure 7:
Figure 8:
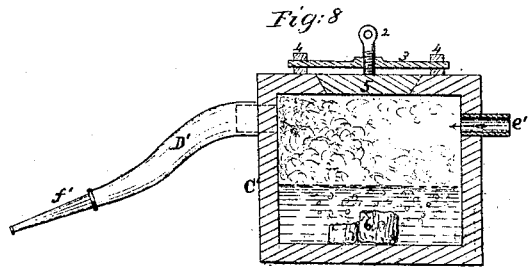

In the accompanying drawings, which form part of my specification, Figure 1, Sheet A, is a perspective view of an ordinary "shank or bull ladle" supported on blocks of glass arranged on trestles. Fig. 2 is a transverse section of a copper mold supported on blocks of glass. Fig. 3 is a perspective view of the mold and its appendages. Fig. 4 is a top view of the mold, representing the top or lid removed. Fig. 5, Sheet B, is a vertical and longitudinal section of the remelting-furnace used in my process for manufacturing steel. Fig. 6 is a side elevation of the same. Fig. 7 is a side view of the rod or bar used for stirring the purifying and detersive agents into and among the fluid cast-iron. Fig. 8 is a vertical section of the apparatus used for generating nitric oxide used in my process.

In my improvement in the process for manufacturing steel, I use about seven parts of the oxide of iron, (iron ore,) one part of red oxide of lead, and two parts of nitrate of soda. These ingredients are reduced to a very fine powder and mixed, agitated, and triturated together until the particles of unlike kinds so unite that a chemical attraction or affinity will take place between all the particles and form one homogeneous mass, which I use as a detersive and converting agent by mixing it with the fluid cast-iron, as hereinafter described. I also use the above compound with the addition of water for forming a pasty mass, with which I coat the interior of the shank A and the copper mold D, furnishing each with a thin coating of the pasty material, and while damp dusting them with the red oxide of lead, after which they are thoroughly dried before running the fluid cast-iron into them.

I mix from six to ten pounds of the hereinbefore-described detersive and converting agent with about one hundred pounds of the fluid cast-iron, in the following manner: Having the shank and molds prepared and dried as above, I place the handles $e$ of shank A on glass blocks, C, which rest on the trestles B, as shown in Fig. 1 of Sheet A. I then place the copper mold D on the glass blocks J, with its lid $l$ properly placed on it, and arrange a pipe over the opening $h$, as indicated by the dotted lines $k$, for the purpose of carrying the gases above the heads of the workmen. I then place in the apparatus C' a few pieces of iron or other suitable metal and cover them with nitric acid diluted with water, and then secure the lid 5 to its place by means of the bar 3, staples 4, and screw 2. (Clearly shown in Fig. 8 of Sheet B.)

To the pipe $e'$ of the apparatus C' is attached a fan or other blowing device. To the apparatus C' is also attached a flexible pipe, D', which is provided with a metallic nozzle, $f'$. This nozzle is placed in the pipe $g$ of the mold D, which is also provided with a pouring-pipe, $f$. The pipes $f$ and $g$ are arranged with relation to the mold D so that the fluid metal, on being poured into the mold, and the nitric oxide when blown into it, will each of them strike against the side of the mold, and thereby have a whirling motion imparted to them, as indicated by the arrow 1 and dotted lines $x\,x$. The bottom, sides, and lid of the mold D should in thickness be about equal to the thickness of the casting made in it—that is to say. if the mold is two inches deep, then the bottom, sides, and lid should each be about one inch thick. The most desirable size for the mold is about thirty inches in diameter and about two inches in depth. The under surface of the lid $l$ should be coated with the same material that is used for coating the body of the mold. The lower end, 8, of the stirring-bar $g'$ should be made of wood, and be about twelve inches long and about two inches in diameter, and provided with a series of transverse openings, the diameter of which should be about one-half of an inch. These openings I fill with the hereinbefore-described detersive and converting agents prior to stirring the fluid metal with the bar.

As the construction, arrangement, and preparation of the several parts relating to the first part of my process will readily be understood from the foregoing and by reference to the accompanying drawings, I will therefore proceed to describe the operation and rationale of the same.

Having reduced the cast-iron to its most fluid condition (milk-white) through the medium of a suitable furnace, I place in the bottom of the shank about three pounds of the detersive and converting agent, previously heated to about 300° Fahrenheit. The shank being properly insulated, about three hundred pounds of the fluid cast-iron is run from the furnace into the shank. I then mix into and among the fluid metal the detersive and converting agent with the bar $g'$. The stirring in and mixing of the detersive and converting agent may be commenced as soon as the fluid iron commences running into the shank. The wooden part 8 of the bar $g'$ will burn away while stirring in the detersive and converting agent among the fluid iron, and thereby distribute in and through the mass that portion of the agent placed in the transverse openings. The detersive and converting agent may also be mixed in and among the fluid metal by placing it in a tapering tube of iron open at both ends, and pasting over the largest end, which enters the fluid metal, a thick piece of paper, which will burn off and allow the contents of the tube to flow out while the tube is being moved around and through the fluid metal in the shank. Having thoroughly mixed the detersive agent in and through the fluid metal, so that all the particles of each will come in contact with each other, I then skim off the impurities which rise on the surface of the fluid metal and pour the metal into the pipe $f$, and from which it flows into the copper mold D, and, striking against the side of it, causes it to flow with a whirl around in the mold, thereby causing the deleterious gases to collect toward the center of the mold; and simultaneous with the flowing of the fluid metal into the mold a current of nitric oxide and air is forced into it through pipe $g$ by means of the apparatus C' and the fan or blowing device attached to it. The current of nitric oxide and air combined, sweeping around in the mold and over the flowing iron, causes the phosphorus in it to burn up, and at the same time forces the impure and deleterious gases out through the pipe placed over it. After the fluid metal has become sufficiently congealed in the mold, the lid $l$ is removed by attaching suitable hoisting-gear to the staples $i$. The mold D is then inverted and the congealed mass discharged from it, and the mass is then removed to the converting furnace and embedded in pulverized charcoal, to undergo the converting process by "cementation," which process is well understood. After being removed from the converting-furnace, the mass is broken into a number of pieces and placed in the remelting-furnace on the inclined bottom y', as indicated at P, (see Fig. 5, Sheet B,) where it is subjected to a flame passing through the opening m, which may be connected to a fire-chamber or other heating device. The metal P as it melts flows down into the basin J, where it is subjected as it accumulates to another flame coming through the opening n, which is also connected to a fire-chamber or other heating device. After all the metal has been melted and run down into the basin J, as indicated at o, and has there been subjected to sufficient heat to remove the remaining impurities, it is then drawn off at S' into a shank or other vessel and poured into copper molds for forming ingots, which are afterward reheated, hammered, or rolled in the usual manner and by the ordinary means for the purpose of working them into bars or other forms of merchantable steel.

In Figs. 5 and 6, A' represents the remelting-furnace; B', its charging-door; R, its stack; S, the damper of the stack, which is adjusted through the medium of chain y. This furnace, with its heating appendages attached, I propose making the subject of another application for Letters Patent, and therefore will not further describe it in this specification.

The quality of steel made by my process as herein described will depend on the time it is subjected to the process of cementation, and to the amount of heat to which it is subjected in the remelting-furnace, and also to the re-reheating and hammering of the ingots. The more perfect the process of cementation the greater the degree of heat in remelting, and the more perfect the skill in reheating and hammering of the ingots the better will be the quality of steel.

Good steel under the microscope shows large groups of fine crystals like the points of needles, all arranged in the same direction and parallel to each other, and the exact parallelism of the pointed ends of the crystals is one of the most decisive tests for a good quality of steel. The crystals in a good quality of steel are octahedron in form, or rather a double pyramid raised upon a flat base. In common steel the crystals approach more to the cubical form.

It is a well-established fact that crystals have polarity, and their terminations or poles are the center of the forces by which a series of similar particles are attracted to each other to form a regular solid, and this fact must be kept in view in the process of manufacturing steel. To harmonize with this law of matter and the principle of polarity in its crystals, I insulate the fluid metal during its treatment in the shank, and also insulate the molds prior to pouring the fluid and treated metal into them, for the purpose of keeping it free from any electric or magnetic disturbance of its atoms.

Density and hardness of the metal being a great desideratum in the process of manufacturing steel, and these qualities being obtained through the medium of heat and rapidity of the cooling, and copper being a very powerful conductor of heat, I have for this reason adopted the use of copper molds for obtaining density and hardness of the metal in my process of manufacturing steel.

The ingredients which form the detersive and converting agent hereinbefore described are used for the oxidizing and converting properties of the oxide of iron on the fluid metal. The nitrate of soda is used for its detersive action, and the red oxide of lead for its opposite electrical relation to that of the sulphur in the iron. The nitric oxide combined with the active current of air is for burning out the phosphorus in the iron and for expelling the deleterious gases from the mold and liquid metal flowing in it.

I do not claim, broadly, the insulation of furnaces, forges, anvils, rolls, and other apparatus and tools used in the manufacture of metals, so as to cut off earth-currents of electricity; but,

Having thus described my process and its rationale, what I claim as of my invention is—

1. Treating the fluid metal in a vessel with the detersive and converting agent herein described, as and for the purpose set forth.

2. Imparting a whirling motion to the fluid metal and nitric oxide in the mold D during the process of casting, substantially as described, and for the purpose set forth.

3. The use of copper mold for casting ingots in the process of manufacturing steel, substantially as described, and for the purpose set forth.

4. The use, in the process of manufacturing steel, of nitric oxide combined with an active current of air, substantially as herein described, and for the purpose set forth.

5. The detersive and converting agent hereinbefore described, when used in the process of manufacturing steel.

JAMES J. JOHNSTON.

Witnesses:
 GEO. H. THOMAS,
 EDM. F. BROWN.